Feb. 2, 1971   K. PRESTON, JR   3,559,465
APPARATUS FOR CONSTRUCTING A HOLOGRAM USING
ACOUSTICAL RADIATION
Filed May 24, 1967   2 Sheets-Sheet 1

INVENTOR.
Kendall Preston, Jr.
BY
Irving M. Kriegsman
ATTORNEY.

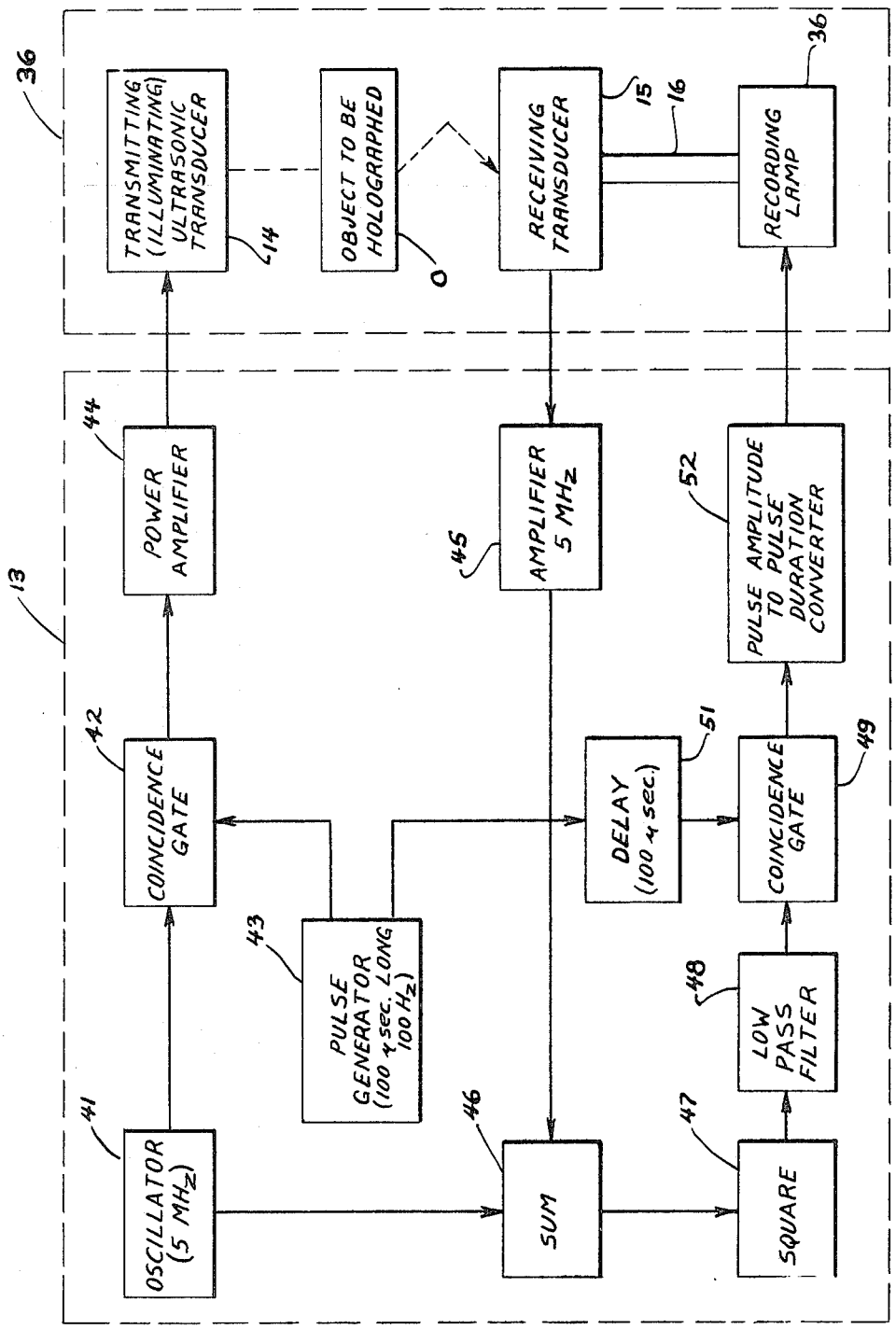

United States Patent Office 3,559,465
Patented Feb. 2, 1971

3,559,465
APPARATUS FOR CONSTRUCTING A HOLOGRAM USING ACOUSTICAL RADIATION
Kendall Preston, Jr., New Haven, Conn., assignor to The Perkin-Elmer Corporation, Norwalk, Conn., a corporation of New York
Filed May 24, 1967, Ser. No. 640,881
Int. Cl. G01n 29/04
U.S. Cl. 73—67.5                    9 Claims

ABSTRACT OF THE DISCLOSURE

A method and apparatus for constructing a hologram using sound waves as the form of radiation energy. A single frequency electrical signal is converted into a coherent beam of sound waves. The sound waves are directed towards and ensonify (illuminate) the object being holographed. Sound waves scattered by the object are detected in a reference plane and converted at each location in said plane into an electrical signal. The electrical signal for each location is added to the original electrical signal to produce an electrical output signal proportional to amplitude times the difference in phase angle of the two signals for that particular location. This output signal is in turn used to modulate a lamp whose output is imaged onto a transparency at a location in geometrical registration with the location of the detected signal.

---

This invention relates to holography. More particularly, this invention relates to a method and apparatus for constructing a hologram using acoustical radiation.

Basically, a hologram is a two dimensional record of the phase and amplitude of a single frequency coherent radiation field which is scattered or dispersed by a (stationary) object. The record is made on a transparency in a plane free of radiation dispersing objects. Although the hologram bears no resemblance to the object it nevertheless contains all the information about the object necessary to form an image by using proper techniques.

Hitherto, a hologram of an object has been constructed by illuminating the object with monochromatic coherent light. Light dispersed or scattered by the object is caused to interfere with a reference wave of light originating from the same light source. The interference pattern thus formed is recorded on a photographic transparency and appears as a series of interference fringes. An image of the object is formed by illuminating the hologram i.e., the photographic transparency, with a beam of monochromatic coherent light which may be, but is not required to be, of the same wavelength as that used in constructing the hologram. The hologram is formed in much the same way as an interferogram is made and actually is, in fact, a particular type of interferogram.

The recent invention of the laser, which produces an extremely intense monochromatic coherent beam of light has made it possible to form optical holograms with far greater ease than heretofore attainable and has thus stimulated considerable interest in the area of holography.

The theory of holograms and experimental data in regard to their formation and subsequent use has been reported in the literature. Detailed information can be found in: (1) the proceedings of the Royal Society, Section A, vol. 197, 1949, at pages 454–487; and (2) proceedings of the Physical Society, Section B, vol. 64, 1951 at pages 449–469. Also further information can be found in U.S. Pat. 2,770,166; U.S. Pat. 2,982,176; and U.S. Pat. 3,083,615.

Although holograms have hitherto been successfully constructed in the manner described above it has been found that the technique used has several limitations which can be attributed mainly to the use of light waves as the radiant energy.

For example, in order to form the interference pattern an auxiliary optical system is needed to provide a reference beam of light. This beam of light must be coherent with the light beam used to illuminate the object.

Another limitation is that when an object is illuminated with a beam of light strong reflections of light from extraneous illuminated regions tend to obliterate information from regions of interest that are less strongly illuminated.

Another limitation resulting from the use of light as the form of radiant energy is that the range of wavelengths involved cover only a relatively small region of the electromagnetic spectrum. Insofar as the resolution in holographic imaging is determined by the wavelength of the radiation, significant changes in the resolution cannot be achieved by controlling the wavelength.

Still another limitation is that if the hologram is recorded on photographic film the wavelength employed must be one at which the film is sensitive.

Another and extremely important limitation is that by using light waves to construct a hologram it is not possible to holograph the interior of an object that is opaque to light.

If these limitations could be overcome the usefulness of holograms would be greatly extended. For example, a hologram could be made of the interior of the human body for use in medical diagnosis. Similarly, a hologram could be made of the internal structure of materials for use in detecting internal voids, cracks or flaws.

Accordingly, it is an object of this invention to provide a new and improved method and apparatus for constructing a hologram.

It is another object of this invention to provide a method and apparatus for constructing a hologram of the internal structure of an object that is opaque to light.

It is still another object of this invention to construct a hologram of an object on a photographic transparency without using light waves to illuminate the object.

It is still another object of this invention to construct a hologram in which the radiation used to illuminate the object is not dependent on the wavelength at which the recording media is sensitive.

It is still another object of this invention to provide a method and apparatus for constructing a hologram which avoids the use of a reference beam of radiation whose wavelength is the same as that which is used to illuminate the object.

The above and other objects are achieved according to this invention in which a hologram is constructed by using acoustical waves rather than light waves as the radiant energy.

Basically, the invention involves ensonifying (illuminating) the object to be holographed with a beam of spatially and temporally coherent acoustical radiation. This acoustical radiation is derived from a single frequency electrical signal. The amplitude and phase of the acoustical radiation scattered or dispersed by the object is recorded on a photographic transparency.

The recording is done indirectly by converting the scattered acoustical radiation on a point by point basis in a reference plane into an electrical signal whose phase and amplitude can be determined with reference to the phase and amplitude of the originating electrical signal. From this information an electrical signal is produced at each of said points which is proportional to the amplitude times the cosine of phase of the scattered radiation relative to the original electrical signal. Sufficient bias is provided to these signals to prevent negative values. The resulting electrical signals are converted into light signals for each point which are recorded on the photographic transparency. The transparency is the hologram.

An image of the object holographed is formed by illuminating the hologram with a beam of monochromatic light.

The invention will become more fully understood and other features and advantages will become apparent on reading the following detailed description when taken in connection with the drawings in which like reference numerals represent like parts and wherein.

Figure 1:
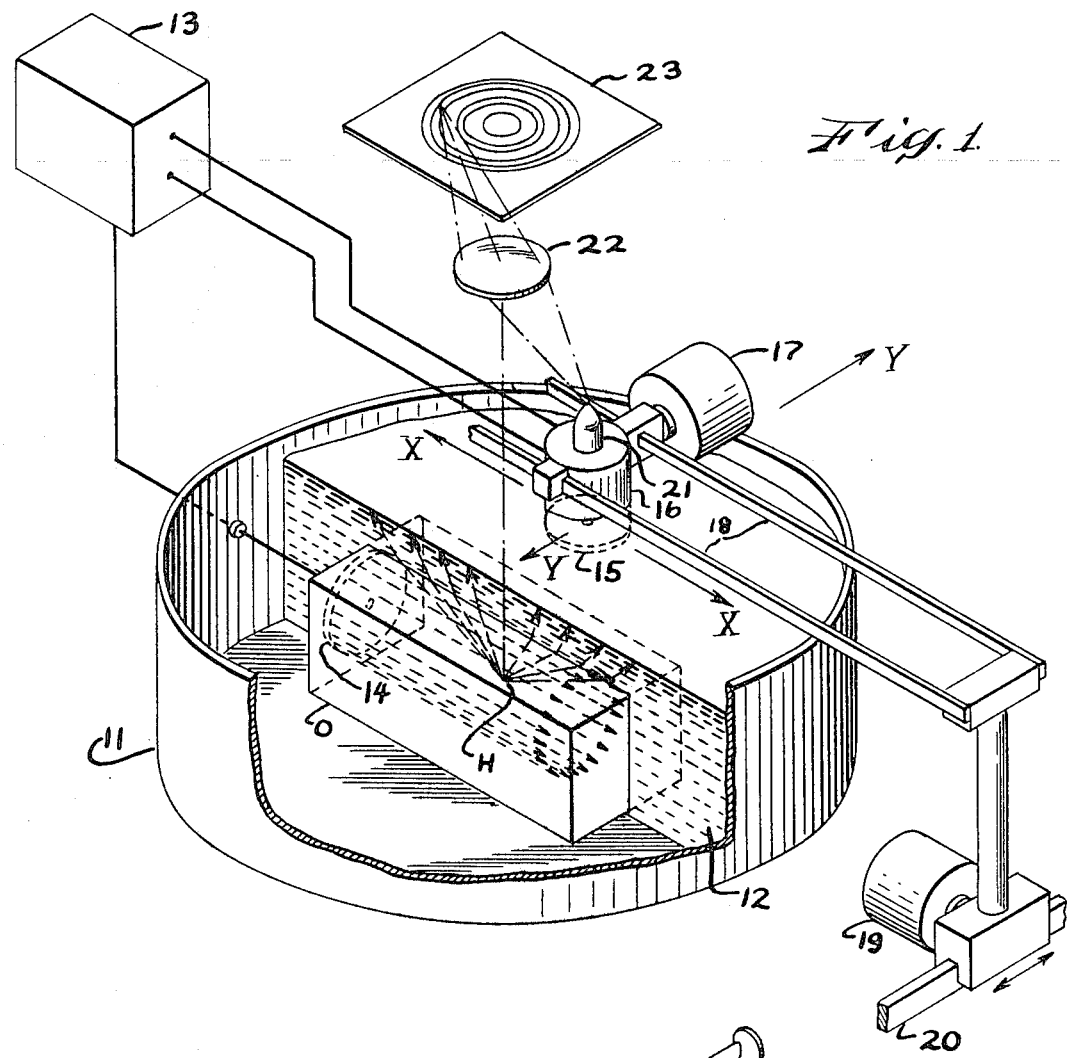
FIG. 1 is a perspective view of an apparatus constructed according to this invention for making a hologram using acoustical waves.

Referring now to FIG. 1 there is shown an embodiment of an apparatus for constructing a hologram according to this invention.

An object (whose interior is) to be holographed is identified by the letter O. The object O, for illustrative purposes, is in the form of a block of optically opaque material such as aluminum and has an internally located hole H.

The object O is preferably disposed in a tank 11 filled with a fluid 12 such as for example water.

A pulsating electrical signal, having a preselected single frequency supplied from a electronics unit 13, is applied to an ultrasonic transmitting transducer 14. The ultrasonic transmitting transducer 14 is secured to a side of the object O (by any well known means) The purpose of the ultrasonic transmitting transducer 14 is to convert the electrical signal into a single frequency beam of coherent ultrasonic radiation. Some of the ultrasonic radiation is transmitted through the object O and some of the radiation is scattered or dispersed by the object O. The scattering may be caused by the hole H which is essentially a plurality of point scatterers. The scattered radiation is illustrated in the drawing by the upwardly directed arrows.

The apparatus further includes an ultrasonic receiving transducer 15 which is also immersed in the fluid 12. The purpose of the ultrasonic receiving transducer 15 is to detect the scattered ultrasonic radiation and converting the same into electrical energy. The ultrasonic receiving transducer 15 is rigidly mounted on a supporting structure 16 which is mounted for scanning in the $x$ and $y$ directions in a hypothetical plane located in the path of the scattered radiation. The type of scanning is approximately like that of a TV raster pattern. The scanning speed is such that the ultrasonic receiving transducer 15 does not move more than one acoustical wavelength between pulses. Additionally, the speed is such that during the duration of a radiated pulse, the transducer 15 moves an amount that is negligible in respect to the acoustic wavelength. Any mechanical arrangement may be employed for achieving the two directional scan. For example, the arrangement may be in the form of a motor 17 operatively connected to the support 16 for moving the support 16 along a pair of rails 18 in the $x$ direction and a motor 19 for moving the rails 18 and hence the support 16 along a rail 20 in the $y$ direction, once a "trace" in the $x$ direction has been completed.

At each point along the scan the ultrasonic receiving transducer 15 detects the sound pulse and converts the same into a first electrical pulse. This electrical pulse is fed back into the electronics unit 13 which produces a second electrical pulse which is proportional to the amplitude times cosine of the phase of the pulse detected by the transducer 15 relative to the phase of the original radiated pulse.

This signal is used to energize a light source 21 which is in the form of a miniature tungsten lamp. Since the pulse delivered to the lamp is proportional to the cosine of the phase angle the amount of light emitted is also proportional to the cosine of the phase angle. Light source 21 is mounted on the supporting structure 16 so that it will move in synchronism with the ultrasonic receiving transducer 15. This provides the proper registration so that the recorded output from the light source 21 (i.e. the hologram) will correspond dimensionally to the sound field detected by the ultrasonic receiving transducer 15.

The output from the lamp 21 is imaged through a lens 22 onto a light sensitive transparency 23 which may be for example, photographic film. The transparency 23 is held stationary relative to the object O (by any well known means).

Transparency 23 is the hologram of the (interior of) object O.

Figure 2:
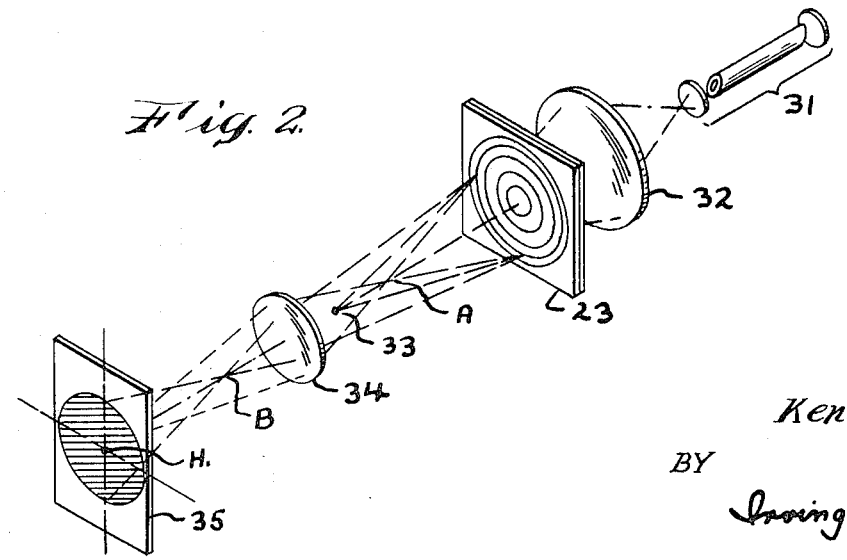
FIG. 2 is a perspective view of an apparatus for forming an image from the hologram constructed according to the apparatus in FIG. 1; and, FIG. 3 is a schematic view in block diagram form of the apparatus shown in FIG. 1.

Referring now to FIG. 2 there is shown a system for forming an image of an object from a hologram constructed in the manner described above. The hologram 23 is illuminated by a beam of monochromatic coherent light from a laser 31. The beam of light from the laser 31 is caused to converge by a suitable lens 32. Two images are formed, one in a plane along the optical axis at point A and another along the optical axis at point B. Zero order light is removed by a suitably positioned stop 33. A magnifying lens 34 projects the image formed at point A showing the hole as H onto a suitable screen 35 where it may be viewed.

Referring now to FIG. 3 there is shown a schematic in block diagram form of the system of FIG. 1. The electronics unit is labeled with reference numeral 13 as in FIG. 1 and the portion of the system including the two transducers (14, 15) and the light source 21 is identified by reference numeral 36.

The electronics unit 13 includes an acoustical frequency oscillator 41 for generating a single frequency electrical signal. The output from the oscillator 41 is applied to a coincidence gate 42 which also receives a signal from a pulse generator 43. The output from the coincidence gate 42 is applied to an amplifier 44.

The output from the amplifier 44 is applied to the ultrasonic transmitting transducer 14 which converts the signal into ultrasonic waves.

Sound scattered by the object O is detected by the ultrasonic receiving transducer 15.

The output from the ultrasonic receiving transducer 15 is applied to an amplifier 45. The output from the amplifier is then fed into a summing circuit 46 which also receives a signal from the oscillator 41. The output from the summary circuit 46 is then square law detected by a square law detector 47. The output from the square law detector is applied to a low pass filter 48. The summing circuit 46, square law detector 47 and low pass filter 48 constitute a phase detector whose reference is provided by the oscillator 41. Thus the necessity for a reference soundwave is completely eliminated. The output from the low pass filter 48 is proportional to the cosine of the phase angle between the signal received from the ultrasonic receiving transducer 15 and the signal generated by the oscillator 41. In order to remove the effect of spurious reflections, the output from the low pass filter 48 is delivered to a coincidence gate 49 which is gated by a pulse from the pulse generator 43 that is delayed by a delaying circuit 51. The output from the coincidence gate 49 is applied to a pulse duration convertor 52 which changes the value of the cosine of the phase angle to a pulse whose duration is proportional to the cosine of the phase angle.

The output from the pulse duration converter is applied to the light source 36.

Holograms have actually and successfully been constructed according to this invention. In the embodiment described above the ultrasonic transmitting transducer was sized to produce a 5 cm. diameter beam of 5 megahertz ultrasonic radiation which had a wavelength of 0.3 mm. in water. The radiation consisted of nominal 100 microsecond pulses repeated at an approximate rate of 100 hertz. The sound field was mapped with an air backed ceramic (receiving) transducer nominally resonant at 5 megahertz and with an effective diameter of about 0.4 mm. The area scanned was about 30 x 30 cm. at a distance of about 10 cm. from the object. The hologram was recorded by making a time exposure photograph of the scanning light at one tenth scale on Polaroid 55 P/N film which produced a negative transparency. The transparency was wetted with tetrahydronaphthalene and sandwiched between two optical flats to minimize phase variations due to film thickness irregularities. A 6328 A. helium-neon laser was used to illuminate the hologram.

Various other arrangements and modifications will be apparent to those skilled in the art and are still considered as being within the scope of the invention as defined in the appended claims.

For example, instead of a single receiving transducer scanning in two directions, a series or row of receiving transducers could be used which would scan or sweep in only a single direction. Similarly, instead of a single receiving transducer scanning in two directions, the sound detecting means could be a planar array of stationary receiving transducers. Each of these transducers would detect the sound field at a particular location. Of course in each of the alternative arrangements, each transducer would have its own associated light source.

It should be noted that, in the illustrative embodiment and the two alternative arrangements described the size of each of the receiving transducers is no greater than the magnitude of the sonic wavelength utilized. In all instances the receiving transducer means should detect a signal in two directions at incremental distances separated by no more than half a sonic wavelength.

I claim:

1. Apparatus for constructing a hologram of a discontinuity within an acoustical-wave transmitting medium, such as a discontinuity within a medium consisting of an optically opaque material, comprising,
    means producing a first electrical signal,
    an ultrasonic transmitting transducer connected to convert said first signal into a beam of coherent ultrasonic radition and mounted for directing said beam into said medium,
    an ultrasonic receiving transducer placed for detecting ultrasonic radiation scattered by said discontinuity and converting it into an electrical signal,
    phase detecting means coupled to the receiving transducer and to a reference electric signal of the same frequency as the first signal for producing an output proportional to the product of the amplitudes of the receiving transducer signal and of said reference signal and the cosine of the phase difference between the latter two signals, and
    means coupled to the phase detecting means for recording the value of the output thereof.

2. The apparatus of claim 1 in which the electrical signal producing means includes an oscillator producing a signal frequency electrical signal in the acoustical frequency range, in which the transmitting transducer converts the signal from the signal producing means into a beam of coherent acoustical radiation, and in which said phase detecting means is coupled to said oscillator and to the receiving transducer.

3. The apparatus of claim 1 including means moving the receiving transducer in a scanning pattern in a plane located in the path of the scattered radiation, and in which said recording means includes means movable in synchronism with the receiving transducer in a corresponding planar pattern for recording valves of the output of the phase detector means in a pattern corresponding to the pattern defined by the movement of the receiving transducer.

4. The apparatus of claim 3 in which said electrical signal producing means produces single frequency pulses, in which the transmitting transducer converts said signal pulses into a single frequency beam of coherent ultrasonic radiation, and which includes gating means coupled to the pulsating signal producing means and to the phase detecting means for passing the output of the phase detecting means to the recording means in timed relation with the pulses of said signal pulses.

5. The apparatus of claim 4 in which said means moving the receiving transducer moves it in said pattern at a speed such that it does not move more than one wavelength of ultrasonic radiation between pulses thereof and moves a negligible amount with respect to said wavelength during the duration of a radiated pulse.

6. The apparatus of claim 4 in which said electrical signal producing means comprises an oscillator producing an electrical signal in the acoustical frequency range coupled to a pulse generator for pulsating said signal, in which said phase detecting means is coupled to said oscillator and to the receiving transducer, and in which said gating means is coupled to said pulse generator.

7. The apparatus of claim 4 in which said recording means comprises a pulse duration converter connected to receive the output of the gating means and to convert it into pulses, the duration of each of which is proportional to the output of the phase detecting means.
    a light source connected to be energized by the latter pulses and movable in synchronism with the receiving transducer in a corresponding planar pattern, and
    means for recording said pattern of light signals.

8. The apparatus of claim 4 wherein the means for recording said pattern of light signals is a planar sheet of light sensitive material.

9. Apparatus for constructing a hologram of a discontinuity within an acoustical-wave transmitting fie'd, such as a discontinuity within a field of an optically opaque material, comprising,
    means producing a pulsating single frequency electrical signal,
    a transmitting transducer connected to convert said signal into a single frequency beam of coherent acoustical radiation and mounted for directing said beam into said field,
    a receiving transducer placed for detecting acoustical radiation scattered by said discontinuity and converting it into electrical pulses,
    means moving the receiving transducer in a planar scanning pattern along successive generally parallel lines at a speed such that it does not move more than one wavelength of acoustical radiation between pulses thereof and moves a negligible amount with respect to said wavelength during the duration of a radiated pulse,
    said pulsating-signal producing means including an acoustical frequency oscillator coupled to a pulse generator,
    phase detecting means coupled to the oscillator and to the receiving transducer producing an output proportional to the product of the amplitudes of the receiving transducer signal and of the oscillator output and the cosine of the phase difference between the receiving transducer signal and the oscillator output,
    a coincidence gate coupled to be gated by pulses fiom the pulse generator and connected to the output of the phase detecting means for passing the output of the phase detecting means in timed relation with the pulses of said pulsating signal,
    a pulse duration converter connected to receive the output of the coincidence gate and to convert it to signal pulses, the duration of each of which is proportional to the cosine of the phase difference between the receiving transducer signal and the oscillator output,
    a light source connected to be energized by said signal pulses and movable in synchronism with the receiving transducer in a corresponding pattern, and
    means for imaging light from the light source onto a photosensitive film for recording the output of the light source on said film.

References Cited

UNITED STATES PATENTS

| 2,957,340 | 10/1960 | Rocha | 73—67.5 |
| 3,013,170 | 12/1961 | Sheldon | 73—67.5X |
| 3,284,799 | 11/1966 | Ross | 343—6 |
| 3,400,363 | 9/1968 | Silverman | 340—3 |

OTHER REFERENCES

Leith, E. N. et al., Holograms: Their Properties and Uses, S.P.I.E. Journal Oct./Nov. 1965.

RICHARD C. QUEISSER, Primary Examiner

J. P. BEAUCHAMP, Assistant Examiner

U.S. Cl. X.R.

73—67.9; 340—3, 5; 350—3.5

UNITED STATES PATENT OFFICE
CERTIFICATE OF CORRECTION

Patent No. 3,559,465  Dated February 2, 1971

Inventor(s) Kendall Preston, Jr.

It is certified that error appears in the above-identified patent and that said Letters Patent are hereby corrected as shown below:

Claim 8, line 1, after "claim" change "4" to -- 7 --.

Signed and sealed this 1st day of June 1971.

(SEAL)
Attest:

EDWARD M. FLETCHER, JR.  WILLIAM E. SCHUYLER,
Attesting Officer  Commissioner of Pate